United States Patent

Kamoi

(10) Patent No.: US 9,560,230 B2
(45) Date of Patent: Jan. 31, 2017

(54) IMAGE FORMING APPARATUS, CONTROL METHOD FOR THE SAME AND STORAGE MEDIUM

(71) Applicant: CANON KABUSHIKI KAISHA, Tokyo (JP)

(72) Inventor: Keiko Kamoi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/662,483

(22) Filed: Mar. 19, 2015

(65) Prior Publication Data

US 2015/0281495 A1 Oct. 1, 2015

(30) Foreign Application Priority Data

Mar. 28, 2014 (JP) ................................. 2014-070080

(51) Int. Cl.
H04N 1/04 (2006.01)
H04N 1/00 (2006.01)
H04N 1/32 (2006.01)

(52) U.S. Cl.
CPC ...... *H04N 1/00822* (2013.01); *H04N 1/00384* (2013.01); *H04N 1/00681* (2013.01); *H04N 1/32058* (2013.01)

(58) Field of Classification Search
CPC .............. H04N 1/00551; H04N 2201/0094; H04N 2201/0081; H04N 2201/0436; G03F 7/70058; G03F 7/70341; G03F 7/706; G03F 7/7085; G06T 11/203; G06T 19/00; G06T 2207/10016; G06T 2207/30196; G06T 7/2046

USPC ............ 358/474, 498, 1.11, 1.13, 1.15, 1.18, 1.2,358/446, 448, 475; 399/262, 263, 107, 258, 98, 399/110, 111, 113, 121, 27, 313, 328, 329, 360, 399/381, 92

See application file for complete search history.

(56) References Cited

U.S. PATENT DOCUMENTS

| | | | | |
|---|---|---|---|---|
| 4,695,154 A | * | 9/1987 | Watanabe | G03G 15/5095 356/629 |
| 5,250,262 A | * | 10/1993 | Heidt | G01N 35/00029 422/63 |
| 5,585,943 A | * | 12/1996 | Kikuchi | 358/498 |
| 5,661,567 A | * | 8/1997 | Maeda et al. | 358/400 |
| 5,801,837 A | * | 9/1998 | Hamanaka | H04N 1/3248 358/296 |
| 6,542,633 B1 | * | 4/2003 | Kori | 382/167 |

(Continued)

FOREIGN PATENT DOCUMENTS

| | | |
|---|---|---|
| JP | 06-303301 A | 10/1994 |
| JP | 2001-238013 A | 8/2001 |
| JP | 2008-048208 A | 2/2008 |

*Primary Examiner* — Negussie Worku
(74) *Attorney, Agent, or Firm* — Fitzpatrick, Cella, Harper & Scinto

(57) ABSTRACT

An image forming apparatus of this invention includes abbreviated keys that realize abbreviated input of a transmission destination, an openable cover provided so as to cover the abbreviated keys, and first and second cover open/closed detection switches configured to output an open state and a closed state of the cover. When an operation of an abbreviated key is received, if the first and second cover open/closed detection switches indicate different detection results, mismatch information indicating that different output has been occurred from the first and second cover open/closed detection switches is stored in a non-volatile storage unit, and the image forming apparatus is restarted.

15 Claims, 7 Drawing Sheets

(56) References Cited

U.S. PATENT DOCUMENTS

| | | | | |
|---|---|---|---|---|
| 6,882,822 | B2* | 4/2005 | Gomi | G03G 15/605 |
| | | | | 399/377 |
| 2007/0153325 | A1* | 7/2007 | Mizumukai | H04N 1/00572 |
| | | | | 358/1.15 |
| 2007/0195381 | A1* | 8/2007 | Yamazaki et al. | 358/502 |
| 2011/0228347 | A1* | 9/2011 | Kohara et al. | 358/446 |
| 2011/0317225 | A1* | 12/2011 | Caspar et al. | 358/474 |
| 2012/0162690 | A1* | 6/2012 | Ishiguro | H04N 1/00408 |
| | | | | 358/1.14 |
| 2013/0120794 | A1* | 5/2013 | Kamoi | G06K 15/02 |
| | | | | 358/1.15 |
| 2013/0141753 | A1* | 6/2013 | Kamoi | G06K 15/4095 |
| | | | | 358/1.14 |
| 2013/0148176 | A1* | 6/2013 | Hiro | 358/498 |
| 2014/0002869 | A1* | 1/2014 | Takemoto et al. | 358/474 |
| 2014/0092454 | A1* | 4/2014 | Nakayama et al. | 358/498 |
| 2014/0118804 | A1* | 5/2014 | Tomono et al. | 358/498 |
| 2014/0160523 | A1* | 6/2014 | Kamoi | G06K 15/027 |
| | | | | 358/1.15 |
| 2014/0192386 | A1* | 7/2014 | Ishida | H04N 1/00689 |
| | | | | 358/449 |
| 2014/0355060 | A1* | 12/2014 | Kamoi | G06F 3/1256 |
| | | | | 358/1.15 |
| 2015/0355874 | A1* | 12/2015 | Kamoi | G06F 3/1292 |
| | | | | 358/1.15 |

* cited by examiner

FIG. 5

| COVER OPEN/CLOSED DETECTION SWITCH 305 | COVER OPEN/CLOSED DETECTION SWITCH 306 | COVER OPEN/CLOSED DETERMINATION | |
|---|---|---|---|
| OFF | OFF | OPEN | ~501 |
| OFF | ON | TROUBLE | ~502 |
| ON | OFF | TROUBLE | ~503 |
| ON | ON | CLOSED | ~504 |

IMAGE FORMING APPARATUS, CONTROL METHOD FOR THE SAME AND STORAGE MEDIUM

BACKGROUND OF THE INVENTION

Field of the Invention

The present invention relates to an image forming apparatus, a control method for the same, and a storage medium.

Description of the Related Art

In recent years, the field of image forming apparatuses with a small apparatus size has not only seen fierce cost competition, but also demand for further reduction in size and increase in functionality. Also, personal computers and networks have become widely prevalent, and it has become possible to provide functionality in which an image forming apparatus and an external apparatus work in cooperation such that an image read by the scanner of the image forming apparatus can not only be transmitted as a fax, but also transmitted to an external apparatus as electronic data.

Known methods of easily designating the transmission destination when performing transmission include a one-touch key method in which transmission destinations are assigned to specific hardware keys, and an abbreviated dial method in which transmission destinations are assigned to specific digit numbers. Japanese Patent Laid-Open No. 2001-238013 proposes an image forming apparatus configured such that an openable cover is attached to the operation panel, and the functions of the one-touch keys are switched in accordance with the open/closed state of the cover.

In image forming apparatuses having hardware keys provided with this type of openable cover, consideration has been given to a technique for preventing mistaken fax transmission by providing a configuration for detecting a cover open/closed sensor abnormality. For example, some image forming apparatus have a configuration in which multiple sensors for detecting opening/closing of the cover are provided, and a one-touch key operation for a fax transmission destination is accepted only if the output from the sensors is in a predetermined combination. Japanese Patent Laid-Open No. 2008-048208 proposes a technique in which, if the output from the cover open/closed sensors is in an inappropriate combination when a one-touch key is operated, a service error is generated, and use of the apparatus is disabled.

Japanese Patent Laid-Open No. 06-303301 proposes a technique that in addition to preventing mistaken transmission by making a determination regarding the cover sensor values, also prevents mistaken transmission due to the mistaken pressing of a one-touch key or an abbreviated dial number. Specifically, a method has been proposed in which a display unit is provided for displaying the transmission destinations assigned to the one-touch keys. Furthermore, a technique has been proposed in which the user can switch the setting of whether or not registered information and a prompt for user confirmation are to be displayed before performing transmission. In this technique, "Do not display" is set as the default in consideration of user convenience in one-touch/abbreviated dialing.

However, the above-described conventional techniques have problems such as those described below. For example, with an image forming apparatus according to the above conventional techniques, if the output from the cover open/closed sensor is not appropriate, a service call is made immediately, which is not convenient for the user. However, if the service error is simply eliminated, even in the case where multiple cover open/closed sensors are provided, if there is trouble with both of the sensors, the sensor values will be the same, and it will not be possible to make a determination that the state is normal. In this case, if the setting "Display" has not been made for the input designation confirmation screen for preventing mistaken one-touch input, there is no way to allow the user to check whether or not the designated transmission destination is correct. For this reason, even if the designated transmission destination is incorrect, it is possible for transmission to be performed without the user realizing the mistake, and concern regarding mistaken fax transmission cannot be dispelled. Furthermore, envisioning the case where there is trouble with the cover sensors, if the default setting for the input destination confirmation screen is "Display", the input destination confirmation screen will be displayed even if no problem exists, thus leading to decreased usability.

SUMMARY OF THE INVENTION

The present invention enables realization of an operation system that is user-friendly while also suppressing mistaken transmission, and a mechanism for allowing the user to check the transmission destination in the case where an abbreviated key is operated after determining that output values from sensors for an openable cover provided over abbreviated keys are not appropriate.

One aspect of the present invention provides an image forming apparatus comprising: an abbreviated key configured to realize abbreviated input of a transmission destination; an openable cover provided so as to cover the abbreviated key; first and second cover open/closed detection switches configured to output an open state and a closed state of the cover; and a control unit configured to, when an operation of the abbreviated key is received, if the first and second cover open/closed detection switches indicate different detection results, store mismatch information indicating that different output has been occurred from the first and second cover open/closed detection switches in a non-volatile storage unit, and restart the image forming apparatus.

Another aspect of the present invention provides a control method for an image forming apparatus including an abbreviated key configured to realize abbreviated input of a transmission destination, an openable cover provided so as to cover the abbreviated key, and first and second cover open/closed detection switches configured to output an open state and a closed state of the cover, the control method comprising: performing control with a control unit so as to, when an operation of the abbreviated key is received, if the first and second cover open/closed detection switches indicate different detection results, store mismatch information indicating that different output has been occurred from the first and second cover open/closed detection switches in a non-volatile storage unit, and restart the image forming apparatus.

Further features of the present invention will be apparent from the following description of exemplary embodiments with reference to the attached drawings.

BRIEF DESCRIPTION OF THE DRAWINGS

FIG. 5 is a trouble determination table for a cover open/closed detection mechanism according to the embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of Image Forming Apparatus

Figure 1:
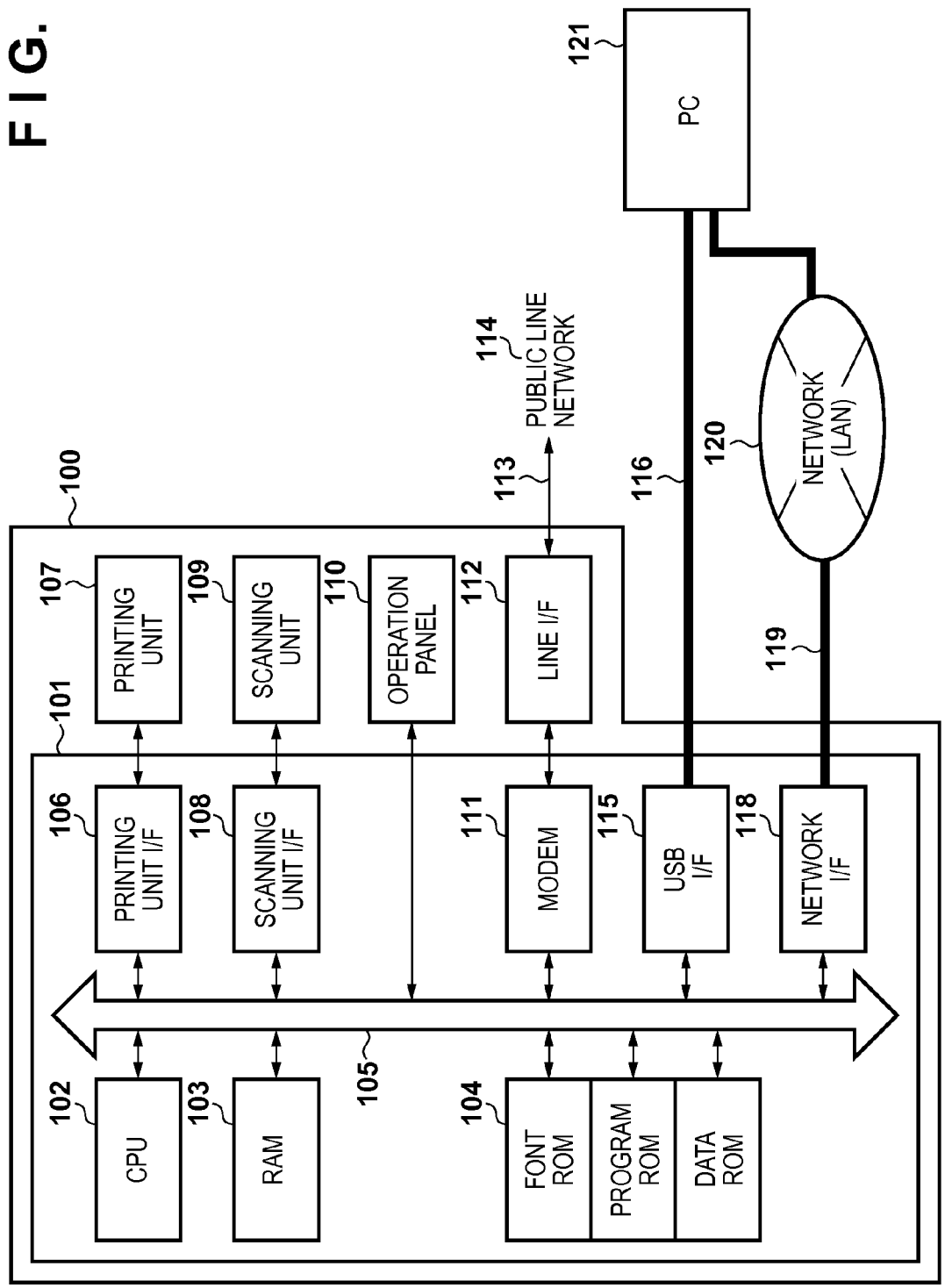
FIG. 1 is a block diagram showing an example of a configuration of an image forming apparatus according to an embodiment.

A first embodiment of the present invention will be described below with reference to FIGS. 1 to 8. First, the configuration of an image forming apparatus according to the present embodiment will be described with reference to FIG. 1. In FIG. 1, the various blocks indicate modules, and the arrows between blocks indicate the flow of data or instructions.

An image forming apparatus 100 includes a printing unit 107, a scanning unit 109, an operation panel 110, a line I/F 112, and a controller 101 that performs control of these units. The controller 101 includes a CPU 102, a RAM 103, a ROM 104, a printing unit I/F 106, a scanning unit I/F 108, a modem 111, a USB I/F 115, and a network I/F 118. These blocks are connected by a system bus 105.

The CPU 102 performs overall control of the blocks in accordance with various control programs. The CPU 102 reads out and executes these control programs stored in a program region of the ROM 104. The CPU 102 also expands compressed data stored in the program region of the ROM 104, loads the expanded data to the RAM 103, and executes processing using the data. Also, the aforementioned various control programs may be stored in a compressed state or uncompressed state in a hard disk drive (HDD) that is not shown in this figure.

The network I/F 118 performs communication processing with a host computer 121 (indicated by "PC" in this figure, and referred to hereinafter as the "PC") via a network (LAN) 120 or the like. The network I/F 118 and the network 120 are connected by a communication cable such as a LAN cable 119. The modem 111 connects to a public line network 114 via the line I/F 112 and performs communication processing with another image forming apparatus, a fax machine, a telephone, or the like (none of which are shown). The line I/F 112 and the public line network 114 are normally connected by a phone line 113 or the like.

The printing unit I/F 106 serves as an interface for outputting image signals to the printing unit 107 (printer engine). Also, the scanning unit I/F 108 serves as an interface for the input of scanned image signals from the scanning unit 109 (scanner engine). The CPU 102 processes image signals input via the scanning unit I/F 108, and outputs the processed image signals to the printing unit I/F 106 as recording image signals.

The CPU 102 displays characters and symbols on a display unit of the operation panel 110 using font information stored in a font region of the ROM 104, and receives instruction information from the operation panel 110 upon reception of user instructions. Also, apparatus information regarding the image forming apparatus 100, user phone book information, department management information, and the like are stored in a data region of the ROM 104 by the CPU 102, as well as read out as necessary and updated as necessary by the CPU 102. Although the scanning unit 109 and the printing unit 107 are provided inside the image forming apparatus 100 in this block diagram, either or both of them may be provided externally.

Operation Panel

Figure 2:
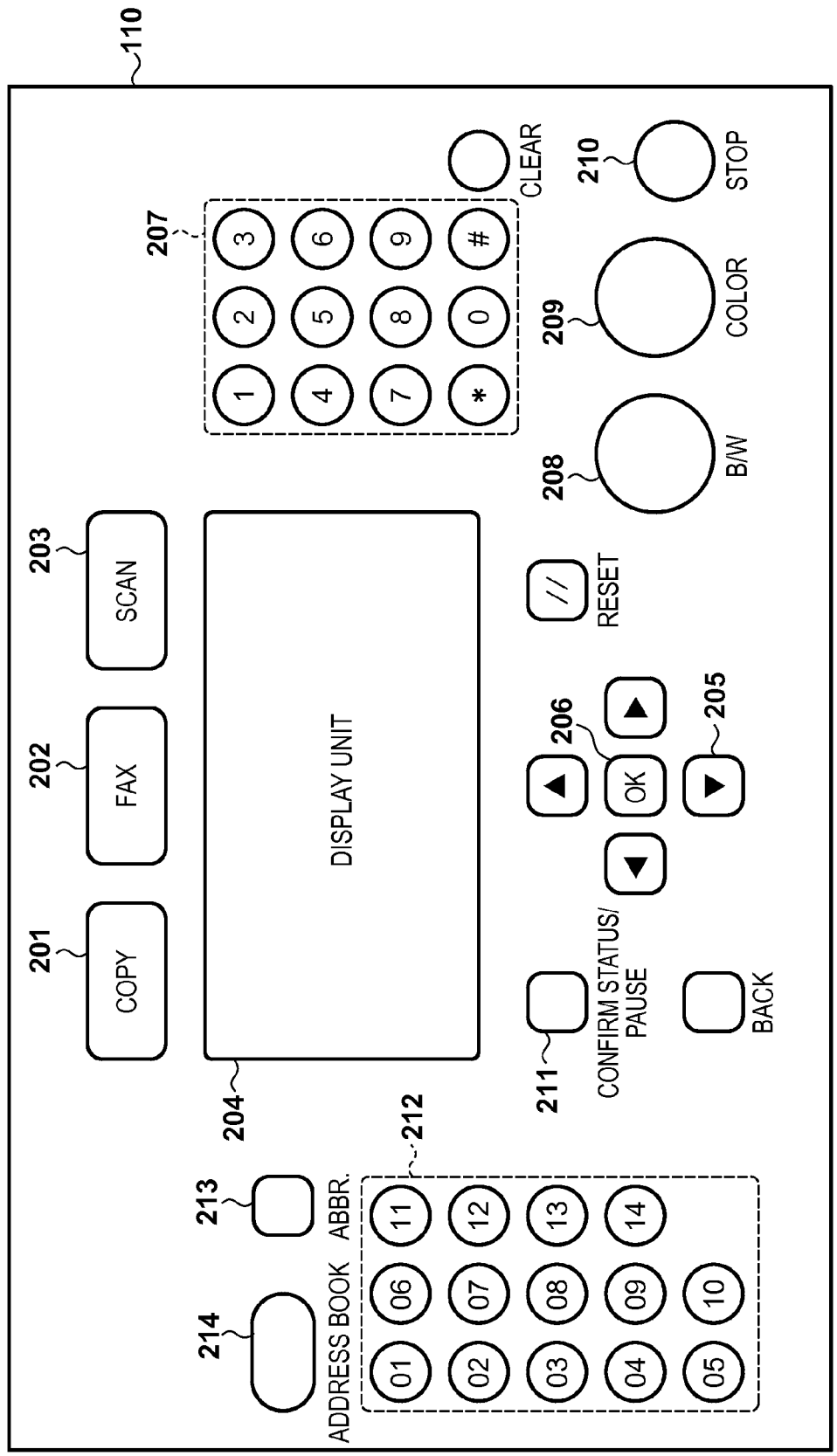
FIG. 2 is a diagram showing an operation panel of the image forming apparatus according to the embodiment.

The following describes an example of the configuration of the operation panel 110 of the image forming apparatus 100 in the present embodiment with reference to FIG. 2. The image forming apparatus 100 of the present embodiment has a copy function realized by the scanning unit 109 and the printing unit 107 described above, a scan function realized by the scanning unit 109 and the USB I/F 115, and the like. It additionally has a fax function realized by the modem 111 and a function for performing printing in accordance with an instruction received from the PC 121 via a USB (Universal Serial Bus) 116 or the network 120.

The operation panel 110 will be described below. The operation panel 110 is provided with function keys 201 to 203 for selecting the above-described functions, and the user operates the button of the function they desire to use. The operation panel 110 also has a display unit 204 for notifying the user of setting states and the device state of the image forming apparatus 100. Arrow keys 205 are used to move a cursor or the like displayed on the display unit 204. The arrow keys 205 are four buttons, namely up, down, left, and right buttons. An OK key 206 is arranged in the center of the arrow keys, and has the function of an "enter key" with respect to settings and inquiries.

The user uses a numeric keypad 207 to input the number of copy sets, the phone number to be used in the fax function, and so on. A B/W (Black/White) start key 208 and a color start key 209 are provided as keys for instructing the start of copying, scanning, and faxing. In an image forming apparatus that has a function capable of determining whether an original is a color original or a monochrome original when scanning the original, there are cases where separate start keys are not provided as shown in FIG. 2.

A stop key 210 is a key for giving an instruction to stop the operation of the functions. However, other methods of stopping operations include allowing the user to use a confirm status/pause key 211 to select and stop a process that is to be stopped in a screen for confirming the status of processing currently being performed in the image forming apparatus 100. In this case as well, the aforementioned arrow keys 205 and OK key 206 are used when making the selection and determination.

Methods of realizing the abbreviated input of a transmission destination in the case of performing faxing or transmission include one-touch keys 212, an abbreviated key 213, and an address book key 214. The one-touch keys 212 are buttons each having one registered destination, and a destination can be designated by operating a desired button. The detailed configuration of the one-touch keys 212 will be described later with reference to FIG. 3. In abbreviated dialing, a screen prompting the input of a number is displayed on the operation panel 110 when the abbreviated key 213 is operated, and a desired destination can be designated by using the numeric keypad 207 to input the number assigned to the desired destination. In the case of the address book, a list of destinations registered in the image forming apparatus 100 is displayed, a desired destination is selected using the arrow keys 205, and the desired destination is determined using the OK key 206.

One-Touch Keys

Figure 3:
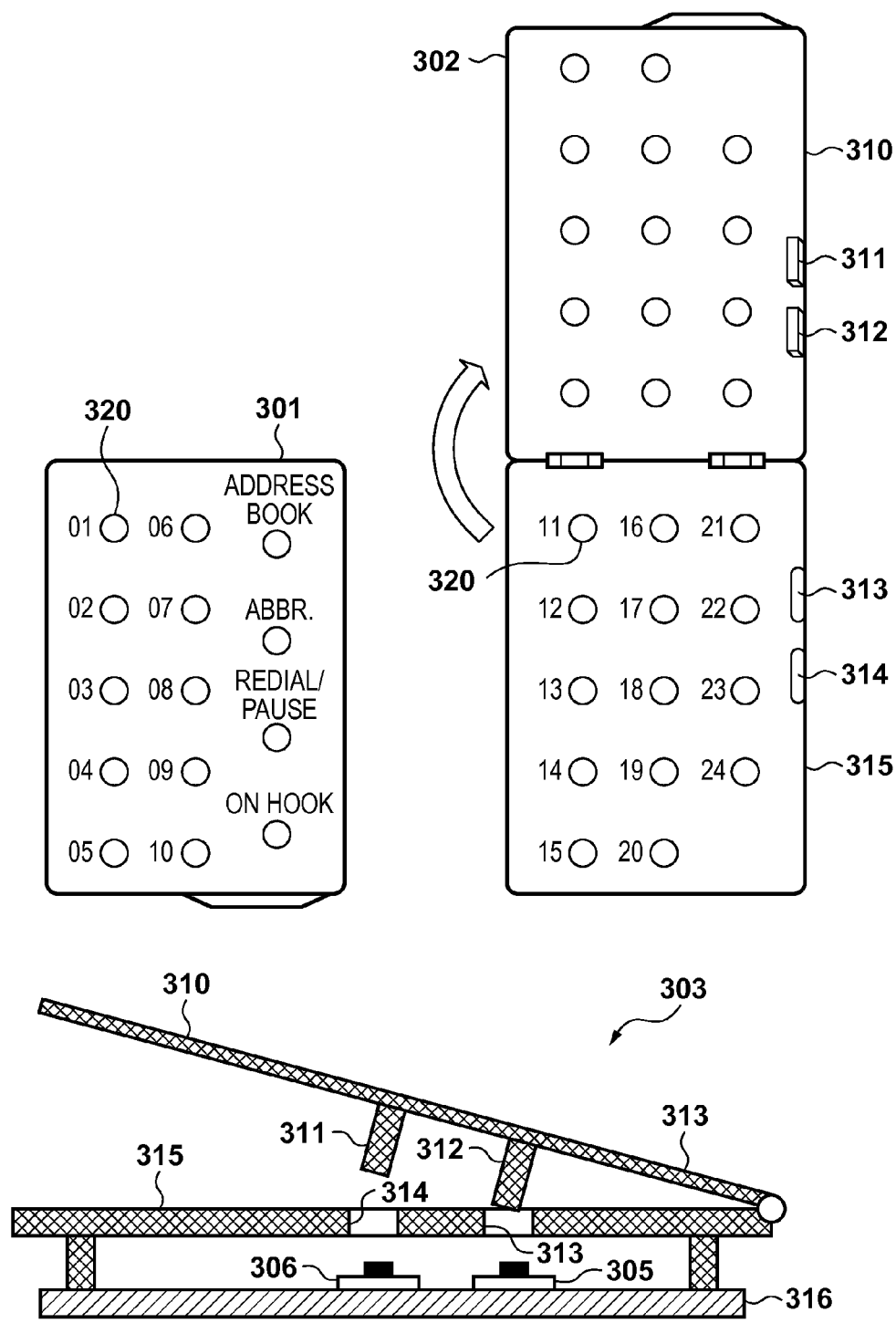
FIG. 3 is an external view of a region including one-touch keys included in the operation panel of the image forming apparatus according to the embodiment.

Next, the configuration of the one-touch keys included in the operation panel 110 will be described with reference to FIG. 3. The one-touch keys 212 are provided with a cover 310 that covers the keys and can be opened and closed. Reference number 301 shows the cover 310 of the one-touch keys 212 in the closed state. As shown by 301, 14 input keys are arranged as the one-touch keys 212.

Reference number 302 shows the cover 310 of the one-touch keys 212 in the open state. The cover 310 is a mechanism that opens and closes with the upper side of the one-touch keys 212 in FIG. 3 serving as the axis. Reference number 320 indicates one input key among the one-touch keys, and multiple destinations can be registered for this input key, such as the one-touch dial number "01" when the cover 10 is in the closed state, and the one-touch dial number "11" when the cover 10 is in the open state.

Reference number 315 indicates an exterior that covers the one-touch keys. Reference signs 311 and 312 indicate protrusions provided on the inner side of the cover 310, and reference signs 313 and 314 indicate opening portions provided in the exterior 315. The protrusion 312 is configured so as to push a cover open/closed detection switch 305 through the opening portion 313 when the cover 310 is closed. Similarly, the protrusion 311 is configured so as to push a cover open/closed detection switch 306 through the opening portion 314 when the cover 310 is closed.

Reference number 303 indicates a cross-sectional diagram of the one-touch key 212 region as viewed from the side. Reference number 316 indicates an operation portion substrate on which the cover open/closed detection switches 305 and 306 are mounted. As shown by 303, the opening portions 313 and 314 are arranged directly above the cover open/closed detection switches 305 and 306. The cover open/closed detection switches 305 and 306 output an electrical ON state as the detection result when the cover 310 is closed and the protrusions 311 and 312 are pressed down. Also, the cover open/closed detection switches 305 and 306 transmit an electrical OFF state to the CPU 102 via the operation panel 110 as the detection result when the cover 310 is open and the protrusions 311 and 312 are not pressed down.

Address Book

Figure 4:
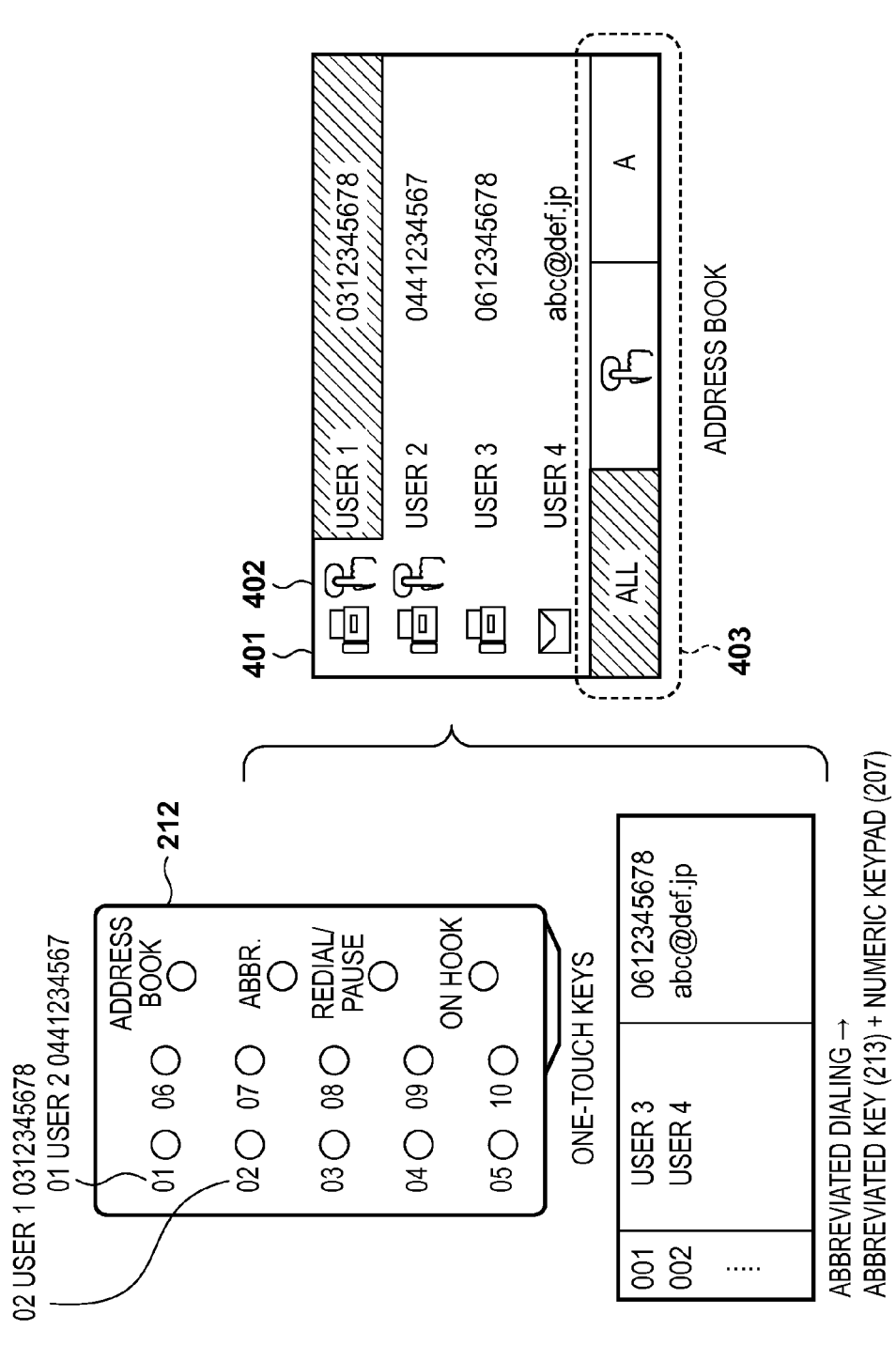
FIG. 4 is a diagram showing an association between an address book and one-touch keys/abbreviated dial numbers according to the embodiment.

Next, the one-touch keys/abbreviated dialing and the address book of the present embodiment will be described with reference to FIG. 4. In FIG. 4, among the one-touch keys 212, user 1 has been assigned to key 01, and user 2 has been assigned to key 02. Also, in the abbreviated dialing, user 3 has been assigned to 001, and user 4 has been assigned to 002. In order to designate abbreviated dialing, the abbreviated key 213 is operated, and then a registered number is input using the numeric keypad 207. The destinations registered for the one-touch keys and the abbreviated dialing can be referenced and used from the address book as well.

The address book is displayed by operating the address book key 214. Icons 401 indicate the protocol of the registered destinations. In FIG. 4, these icons indicate that users 1 to 3 are of the fax protocol, and user 4 is of the e-mail protocol. Icons 402 indicate whether the registered destinations have been assigned to any of the one-touch keys 212. In FIG. 4, user 1 and user 2 have been assigned to one-touch keys 212. The items displayed in the address book can be switched using tabs 403. In FIG. 4, the three tabs "All", "One-touch keys", and "destinations beginning with 'A'" are shown. The currently selected destination and tab items are displayed in a highlighted manner. In FIG. 4, "All" has been selected.

Trouble Determination

Next, cover sensor trouble determination of the present embodiment will be described with reference to FIG. 5. As shown by reference numbers 502 and 503, the CPU 102 determines that there is trouble with the cover 310 if the output is different between the cover open/closed detection switches 305 and 306. For example, if the cover open/closed detection switch 305 has failed and always outputs the ON state, a mismatch occurs between the two switches when the cover 310 is opened and a one-touch key is operated, and thus it is determined that there is trouble with the cover. If both of the switches are outputting the OFF state, it is determined that the cover 310 is in the open state (OPEN). If both of the switches are outputting the ON state, it is determined that the cover 310 is in the closed state (CLOSED). If the output of the two switches is different, mismatch information indicating that fact is stored in a non-volatile memory. Note that although a detailed description will be given later, the number of occurrences may be stored as this mismatch information.

Note that a table defining the trouble determination table shown in FIG. 5 is stored in the ROM 104 or the like in advance in the image forming apparatus 100 of the present embodiment. Accordingly, the CPU 102 makes the trouble determination with reference to the table stored in the ROM 104. Note that since the trouble determination can be made based on whether or not the two sensor values are different here, the trouble determination may be made without referencing the aforementioned table. If a complicated determination is necessary, it is desirable to make the trouble determination using the above-described table or the like. The term "cover sensors" used below refers to the cover open/closed detection switches 305 and 306.

Screen Examples

Figure 6:
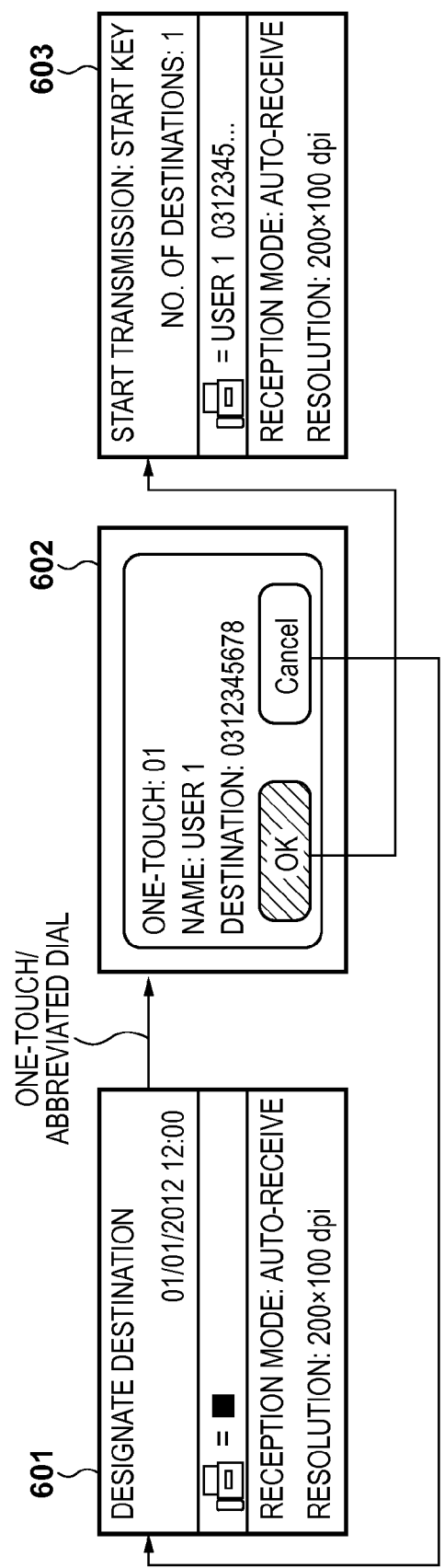
FIG. 6 is a diagram showing a flow of screens in the case where a destination is designated by a one-touch key or an abbreviated dial number according to the embodiment.

Next, the flow of screens in the case of designating a destination using the one-touch keys or abbreviated dialing in the present embodiment will be described with reference to FIG. 6. The screens described below are displayed on the display unit 204 of the operation panel 110. Reference number 601 indicates a fax top screen displayed on the operation panel 110, which is a screen for waiting for the input of a destination. If the user designates a destination using the one-touch keys or abbreviated dialing in this screen, an input destination confirmation screen 602 showing the content of the input one-touch key 212 is displayed on the operation panel 110, and the user is prompted to check the content. Specifically, the input destination confirmation screen 602 is a display that allows the user to select whether or not to execute transmission to the destination set by operating the abbreviated key or the like. The input destination confirmation screen 602 shows that the one-touch key 212 "01" was selected, and that "0312345678" is the destination associated with that one-touch key 212.

The user checks the content of the input destination confirmation screen 602, selects "OK" if the destination is the desired destination, and selects "Cancel" if the destination is not the desired destination. If "OK" is selected in the input destination confirmation screen 602, a transition is made to a fax screen 603 in which the destination is designated. If "Cancel" is selected in the input destination confirmation screen 602, a return is made to the screen 601 without designating a destination. Transmission settings and a start key for starting transmission are displayed in the screen 603.

Figure 7:
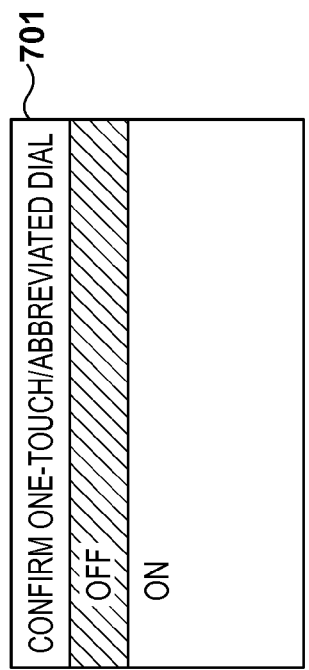
FIG. 7 is a diagram showing a screen for setting whether or not an input destination confirmation screen is to be displayed according to the embodiment.

Next, a screen 701 for setting whether or not the input destination confirmation screen 602 is to be displayed according to a user operation in the present embodiment will be described with reference to FIG. 7. If "OFF" is selected in the screen 701, the input destination confirmation screen 602 is not displayed even if a destination is input using the one-touch keys or the abbreviated dialing. On the other hand, if "ON" is selected in the screen 701, the input destination confirmation screen 602 is displayed on the operation panel 110 if a destination is input using the one-touch keys or the abbreviated dialing.

Processing Procedure

Figure 8:
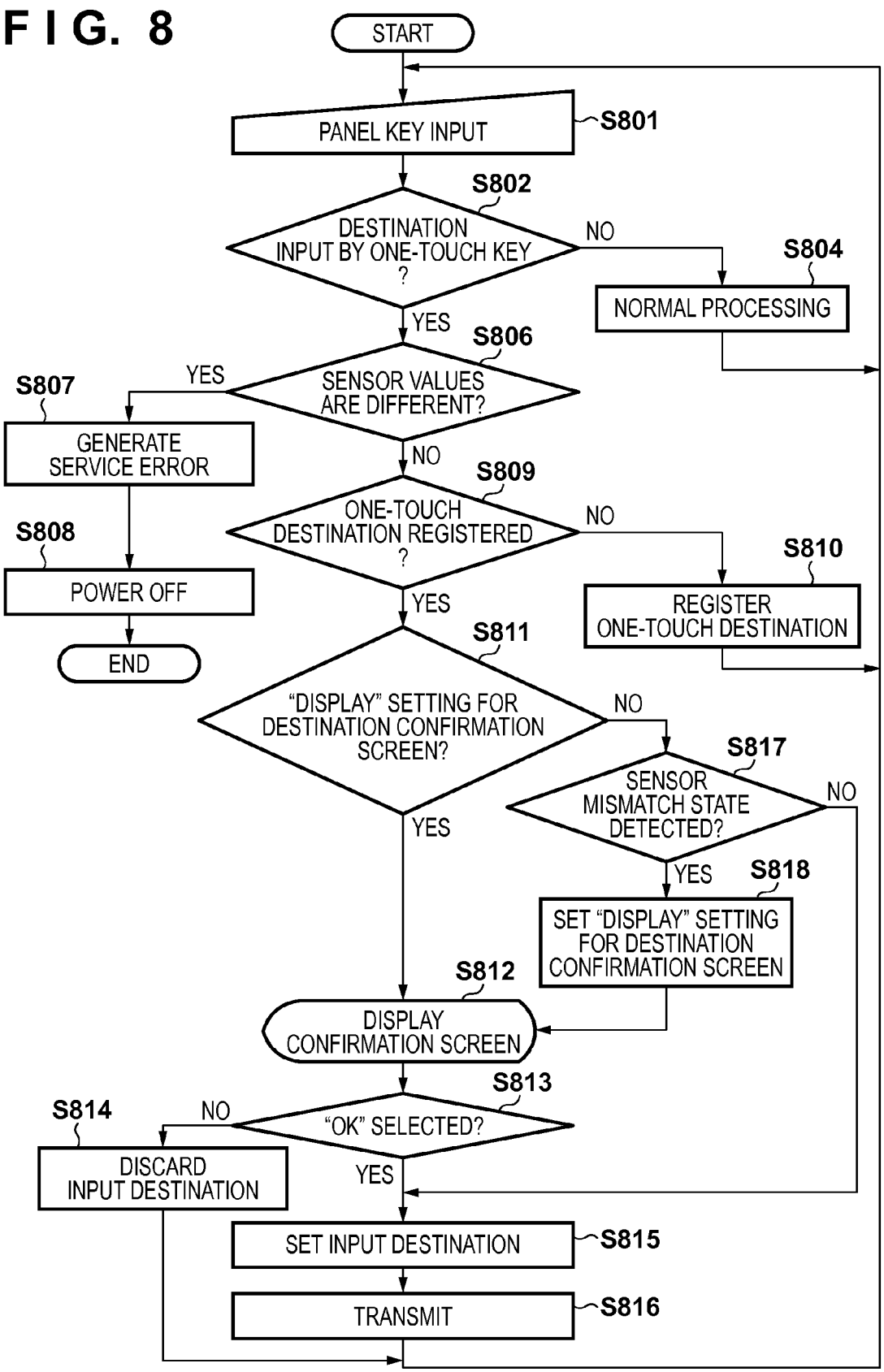
FIG. 8 is a flowchart of processing performed by the image forming apparatus according to the embodiment.

Next, a procedure of processing for switching the display setting for the input destination confirmation screen 602 in the present embodiment will be described with reference to FIG. 8. The processing described below is realized by the CPU 102 reading out a control program stored in the ROM 104 or the like to the RAM 103 and executing it.

In step S801, the CPU 102 receives input of a key selected by the user via the operation panel 110. Next, in step S802, the CPU 102 determines the type of the key that was input in step S801. If the input of a key other than the one-touch keys 212 was detected, the procedure moves to step S804, in which the CPU 102 displays a screen corresponding to the input key on the display unit 204 of the operation panel 110, and ends this processing. In other words, normal processing is executed if a key other than the one-touch keys 212 is input.

On the other hand, if the input of a destination by an operation of the one-touch keys 212 is detected, the procedure moves to step S806, in which the CPU 102 determines whether or not there is trouble with the cover open/closed detection mechanism. This trouble determination may be made by referencing mismatch information stored in the non-volatile memory. Specifically, it is determined that there is trouble if the mismatch information indicates that the output from the cover open/closed detection switches 305 and 306 is different. At this time, the CPU 102 stores the number of times that it was determined that there is trouble in the non-volatile memory or the like. The stored information is referenced in later-described step S817 in order to determine whether or not the sensors are in an unstable state.

If there is trouble, the procedure moves to step S807, in which the CPU 102 performs control so as to display a service call error on the display unit 204 and disable use of the image forming apparatus 100 due to the possibility of making a dialing error. In consideration of the timing of transition between the cover open/closed states and the occurrence of mismatched sensor values due to contamination by a foreign substance or the like, the error state is not latched (held), but rather the apparatus is recovered from the service call state by a power OFF/ON (restart) operation in step S808. Not latching (holding) the error state means that information is not stored in the non-volatile memory, and thus the non-volatile memory is cleared due to the power OFF/ON. In other words, once the power is switched OFF and then ON, it is not possible to detect past abnormal system states (service call states). That is to say, the error state is eliminated by the restart.

On the other hand, if there is no trouble, the procedure moves to step S809, in which the CPU 102 determines whether or not a one-touch dial destination has been registered for the one-touch key 212 that was input. Note that cases of moving to this flow include not only the case of normal sensor output, but also the case where there is trouble with both of the sensors. If there is trouble with both of the sensors, it is possible for the sensor values to be the same, and therefore it is not possible to determine that it is a normal situation. In this case, there is no guarantee that the one-touch dial destination is set correctly.

If a one-touch dial destination has not been registered, the procedure moves to step S810, in which the CPU 102 performs one-touch dial registration processing. If a one-touch dial destination has been registered, the procedure moves to step S811, in which the CPU 102 checks the display setting for the input destination confirmation screen 602. This display setting is the setting information that was described with reference to FIG. 7. If "Display" has been set for the input destination confirmation screen 602, the CPU 102 displays the input destination confirmation screen 602 on the display unit 204 in step S812.

Next, in step S813, the CPU 102 determines whether the user selected "OK" or selected "Cancel" in the input destination confirmation screen 602. If the user selected "Cancel", the procedure moves to step S814, in which the CPU 102 discards the input destination and ends this processing.

On the other hand, if the user selected "OK", the procedure moves to step S815, in which the CPU 102 sets the input destination as the transmission destination. Transmission processing is thus made possible. In step S816, the CPU 102 executes transmission processing for transmission to the set destination.

If it is determined in step S811 that "Do not display" has been set for the input destination confirmation screen 602, the procedure moves to step S817, in which the CPU 102 references the number of times it was determined that there is trouble with the cover sensors, which was calculated in step S806, and determines the sensor mismatch state. If the sensor mismatch state has not been detected even one time, it is determined that the state is a normal state, and the procedure moves to step S815. In step S815, the CPU 102 sets the input destination as the transmission destination, and thus transmission is made possible.

On the other hand, in order to reduce even a slight risk of mistaken fax transmission, if an unstable cover sensor state has been detected even one time, the procedure moves to step S818, in which the CPU 102 switches the display setting for the input destination confirmation screen 602 from "Do not display" to "Display". After the setting is changed, the procedure moves to step S812, and similar processing is then performed so as to allow the user to check the input before the destination is set.

As described above, according to the present embodiment, if a sensor mismatch is detected when a one-touch key is operated, and the service error state is then entered, the service error can be eliminated by a power OFF/ON operation, and thus the apparatus can continue to be used. Also, when a cover sensor mismatch is detected, in consideration of the risk of mistaken transmission, a setting switch is automatically made such that the destination input confirmation screen is displayed, and therefore even if the service error is eliminated, there is an increased possibility of being able to prevent mistaken transmission. In other words, it is possible to enable use of the device as often as possible while ensuring a minimum level of security. Unlike the service error state, the change to the setting for the input destination confirmation screen 602 is held even after the power OFF/ON operation, thus making it possible to provide an image forming apparatus that can be used as often as possible while ensuring a minimum level of security. Note that although the threshold for the number of occurrences of sensor value mismatch is "1" in the above embodiment, the threshold may be changed to a predetermined threshold in accordance with the configuration. In this case, a notification can be mandatorily displayed on the confirmation screen if the number of occurrences reaches the predetermined threshold after the change.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-070080 filed on Mar. 28, 2014, which is hereby incorporated by reference herein in its entirety.

What is claimed is:

1. An image processing apparatus comprising:
an operation key;
a cover which is able to be opened and closed;
first and second switches which are pushed when the cover is closed; and
a controller that:
   a) in accordance with operation of the operation key, performs an operation based on a status of the first switch and a status of the second switch, and
   b) performs notification of an error according to operation of the operation key in a case where the status of the first switch and the status of the second switch are different from each other.

2. The image processing apparatus according to claim 1, wherein the controller sets, in accordance with a user operation, a setting of whether or not a confirmation screen for checking a destination set according to the operation of the operation key is to be displayed on a display unit, and
wherein the controller causes the display unit to display the confirmation screen based on the setting.

3. The image processing apparatus according to claim 2, wherein, if the status of the first switch and the status of the second switch are different from each other, the controller causes the display unit to display the confirmation screen according to the operation of the operation key even if the setting is set not to display the confirmation screen.

4. The image processing apparatus according to claim 2, wherein if the number of occurrences of difference of the status of the first switch and the status of the second switch has reached a predetermined threshold, the controller causes the display unit to display the confirmation screen according to the operation of the operation key even if the setting is set not to display the confirmation screen.

5. The image processing apparatus according to claim 2, wherein the confirmation screen is a screen that allows a user to select whether or not to execute transmission to a destination set according to the operation of the operation key.

6. The image processing apparatus according to claim 1, wherein the controller restarts the image processing apparatus in a case where the status of the first switch and the status of the second switch are different from each other.

7. The image processing apparatus according to claim 6, wherein the controller stores, in a non-volatile storage unit, information indicating that the status of the first switch and the status of the second switch are different from each other in a case where the status of the first switch and the status of the second switch are different from each other, and
wherein the controller restarts the image processing apparatus after the the information is stored in the non-volatile storage unit.

8. The image processing apparatus according to claim 1, wherein the controller performs notification of the error by displaying, on a display unit, a screen indicating the error.

9. The image processing apparatus according to claim 1, wherein each of the first and second switches is a switch that is pushed by a protrusion provided on the cover when the cover is closed.

10. The image processing apparatus according to claim 1, wherein the controller comprises at least one processor and at least one memory.

11. The image processing apparatus according to claim 1, wherein the cover is provided so as to cover the operation key.

12. A control method for an image processing apparatus including (1) an operation key, (2) a cover which is able to be opened and closed, and (3) first and second switches which are pushed when the cover is closed, the control method comprising:

performing, according to operation of the operation key, an operation based on a status of the first switch and a status of the second switch; and performing notification of an error according to operation of the operation key in a case where the status of the first switch and the status of the second switch are different from each other.

13. A non-transitory computer-readable storage medium storing a computer program for causing a computer to function as an image processing apparatus including (1) an operation key, (2) a cover which is able to be opened and closed (3) and first and second switches which are pushed when the cover is closed the computer program comprising:

a code to perform, according to operation of the operation key, an operation based on a status of the first switch and a status of the second switch; and a code to perform notification of an error according to operation of the operation key in a case where the status of the first switch and the status of the second switch are different from each other.

14. An image processing apparatus comprising:
an operation key;
a cover which is able to be opened and closed;
first and second switches which are pushed when the cover is closed; and
a controller that:
  a) in accordance with operation of the operation key, performs an operation based on a status of the first switch and a status of the second switch, and
  (b) restarts the image processing apparatus according to operation of the operation key in a case where the status of the first switch and the status of the second switch are different from each other.

15. The image processing apparatus according to claim 14, wherein the cover is provided so as to cover the operation key.

* * * * *